United States Patent
Feng

(10) Patent No.: US 12,456,382 B2
(45) Date of Patent: Oct. 28, 2025

(54) METHOD AND APPARATUS FOR GENERATING SAFE FLIGHT PATH FOR UNMANNED AERIAL VEHICLE, CONTROL TERMINAL AND UNMANNED AERIAL VEHICLE

(71) Applicant: AUTEL ROBOTICS CO., LTD., Guangdong (CN)

(72) Inventor: Yinhua Feng, Guangdong (CN)

(73) Assignee: AUTEL ROBOTICS CO., LTD., Guangdong (CN)

( * ) Notice: Subject to any disclaimer, the term of this patent is extended or adjusted under 35 U.S.C. 154(b) by 213 days.

(21) Appl. No.: 17/659,082

(22) Filed: Apr. 13, 2022

(65) Prior Publication Data
US 2022/0254260 A1     Aug. 11, 2022

Related U.S. Application Data

(63) Continuation of application No. PCT/CN2020/122478, filed on Oct. 21, 2020.

(30) Foreign Application Priority Data

Oct. 16, 2019   (CN) .......................... 201910982607.7

(51) Int. Cl.
*G08G 5/55*     (2025.01)
*G01C 21/20*    (2006.01)
(Continued)

(52) U.S. Cl.
CPC .............. *G08G 5/55* (2025.01); *G01C 21/20* (2013.01); *G05D 1/106* (2019.05); *G08G 5/32* (2025.01);
(Continued)

(58) Field of Classification Search
CPC .. G08G 5/0069; G08G 5/0034; G08G 5/0039; G08G 5/0013; G08G 5/045;
(Continued)

(56) References Cited

U.S. PATENT DOCUMENTS 6,377,875 B1    4/2002  Schwaerzler
9,870,566 B2 *  1/2018  Gong ...................... G08G 5/59
(Continued)

FOREIGN PATENT DOCUMENTS

CN    106716285 A    5/2017
CN    108445905 A    8/2018
(Continued)

OTHER PUBLICATIONS

PCT/CN2020/122478 International Search Report issued Jan. 22, 2021.

*Primary Examiner* — Daniel L Greene
*Assistant Examiner* — Henry R Hinton
(74) *Attorney, Agent, or Firm* — Frank Gao, Esq.

(57) ABSTRACT

The embodiments are a method and apparatus for generating a safe flight path for an unmanned aerial vehicle, a control terminal and an unmanned aerial vehicle. The method includes: obtaining a path feature point set and attribute parameters, the path feature point set including at least one path planning key point and the attribute parameters including at least a flight height; generating a flight path according to the path feature point set, the attribute parameters and a preset path generation policy; and adjusting the flight path according to an elevation data file, to generate a flight path. According to embodiments of the present invention, elevation data is taken into consideration in the planning of the flight path, which avoids flight obstacles in a flight control process, thereby improving the safety of flight of the unmanned aerial vehicle.

6 Claims, 5 Drawing Sheets

(51) Int. Cl.
*G05D 1/00* (2024.01)
*G08G 5/32* (2025.01)
*G08G 5/34* (2025.01)
*G08G 5/57* (2025.01)

(52) U.S. Cl.
CPC ............. *G08G 5/34* (2025.01); *G08G 5/57* (2025.01); *B64U 2201/10* (2023.01); *B64U 2201/20* (2023.01)

(58) Field of Classification Search
CPC .. B64C 39/024; B64U 2201/10; G01C 21/20; G01C 21/005; G01C 21/3826; G05D 1/106; G05D 1/101
See application file for complete search history.

(56) References Cited

U.S. PATENT DOCUMENTS

| | | | |
|---|---|---|---|
| 2016/0116914 A1* | 4/2016 | Mucci | B64U 10/13 |
| | | | 701/2 |
| 2016/0307447 A1* | 10/2016 | Johnson | G08G 5/34 |
| 2017/0337824 A1* | 11/2017 | Chen | G08G 5/0086 |
| 2018/0002010 A1* | 1/2018 | Bauer | G08G 5/0086 |
| 2018/0121877 A1* | 5/2018 | Doherty | G05D 1/0044 |
| 2018/0188051 A1* | 7/2018 | Gaspard-Boulinc | G08G 5/20 |
| 2018/0204469 A1* | 7/2018 | Moster | G08G 5/0069 |
| 2018/0267561 A1* | 9/2018 | Trench | G05D 1/0094 |
| 2019/0094863 A1* | 3/2019 | Silva | B64U 10/14 |
| 2019/0147749 A1* | 5/2019 | Lewis | G08G 5/045 |
| | | | 701/3 |
| 2020/0051439 A1* | 2/2020 | Priest | G08G 5/0052 |

FOREIGN PATENT DOCUMENTS

| | | |
|---|---|---|
| CN | 109375636 A | 2/2019 |
| CN | 109782804 A | 5/2019 |
| CN | 109901617 A | 6/2019 |
| CN | 110750106 A | 2/2020 |

* cited by examiner

METHOD AND APPARATUS FOR GENERATING SAFE FLIGHT PATH FOR UNMANNED AERIAL VEHICLE, CONTROL TERMINAL AND UNMANNED AERIAL VEHICLE

CROSS REFERENCE

The present application is a continuation of International Application No. PCT/CN2020/122478, filed on Oct. 21, 2020, which claims priority to Chinese patent application No. 2019109826077, filed on Oct. 16, 2019, which is incorporated herein by reference in its entirety.

TECHNICAL FIELD

Embodiments of the present invention relate to the field of computer application technologies and in particular, to a method and apparatus for generating a safe flight path for an unmanned aerial vehicle, a control terminal and an unmanned aerial vehicle.

BACKGROUND

With the development of unmanned aerial photography technologies, more and more professional unmanned aerial vehicles are put into daily life and production, for example, unmanned aerial vehicles are used for search and rescue, geophysical survey, agriculture, forestry and plant protection and road cruising. The popularity of unmanned aerial vehicles is increasing day by day. To adapt to different flight tasks, it is necessary to specify precise planning for flight path tasks to ensure the flight accuracy and safety of unmanned aerial vehicles.

In the solutions of the related art, a flight path is generally drawn in a map of a control terminal based on a flight height, a flight speed, an overlap rate and a ground resolution of an unmanned aerial vehicle and the generated flight path is sent to the unmanned aerial vehicle, so that the unmanned aerial vehicle can perform a flight path task according to the flight path. However, the flight control of existing unmanned aerial vehicles cannot avoid flight obstacles caused by mountains or tall buildings.

SUMMARY

The present invention provides a method and apparatus for generating a safe flight path for an unmanned aerial vehicle, a control terminal and an unmanned aerial vehicle, to safely control the flight height, avoid collision accidents caused by improper height control and make flight of an unmanned aerial vehicle safer and more reliable.

According to a first aspect, an embodiment of the present invention provides a method for generating a safe flight path for an unmanned aerial vehicle, the method including:
  obtaining a path feature point set and attribute parameters, the path feature point set including at least one path planning key point and the attribute parameters including at least a flight height;
  generating a flight path according to the path feature point set, the attribute parameters and a preset path generation policy; and
  adjusting the flight path according to an elevation data file, to generate a flight path.

According to a second aspect, an embodiment of the present invention further provides an apparatus for generating a safe flight path for an unmanned aerial vehicle, the apparatus including:
  a parameter obtaining module, configured to obtain a path feature point set and attribute parameters, the path feature point set including at least one path planning key point and the attribute parameters including at least a flight height;
  a flight path module, configured to generate a flight path according to the path feature point set, the attribute parameters and a preset path generation policy; and
  a flight path generation module, configured to adjust the flight path according to an elevation data file, to generate a flight path.

According to a third aspect, an embodiment of the present invention further provides an unmanned aerial vehicle, including:
  one or more processors; and
  a memory, configured to store one or more programs,
  the one or more programs, when executed by the one or more processors, causing the one or more processors to implement the method for generating a safe flight path for an unmanned aerial vehicle according to any embodiment of the present invention.

According to a fourth aspect, an embodiment of the present invention further provides a control terminal, including:
  one or more processors; and
  a memory, configured to store one or more programs,
  the one or more programs, when executed by the one or more processors, causing the one or more processors to implement the method for generating a safe flight path for an unmanned aerial vehicle according to any embodiment of the present invention.

According to the technical solutions of the embodiments of the present invention, a path feature point set and attribute parameters are obtained, the path feature point set including at least one path planning key point and the attribute parameters including at least a flight height; a flight path is generated according to the path feature point set, the attribute parameters and a preset path generation policy; and the flight path is adjusted according to an elevation data file, to generate a flight path. Therefore, the path feature point set is used as the data for controlling the flight of the unmanned aerial vehicle and the elevation data is considered in the planning of the flight path, to avoid obstacles that appear in the flight control process and reduce the probability of occurrence of accidents of the unmanned aerial vehicle, thereby improving the accuracy and safety of controlling the unmanned aerial vehicle.

DETAILED DESCRIPTION

The present invention are further described in detail below with reference to the accompanying drawings and embodiments. It may be understood that specific embodiments described herein are only used to explain the present invention, but not to limit the present invention. In addition, it should be further noted that, for ease of description, the accompanying drawings only show parts relevant to the present invention rather than the entire structure. In addition, the embodiments in the present invention and features in the embodiments may be mutually combined in case that no conflict occurs.

Embodiment 1

Figure 1:
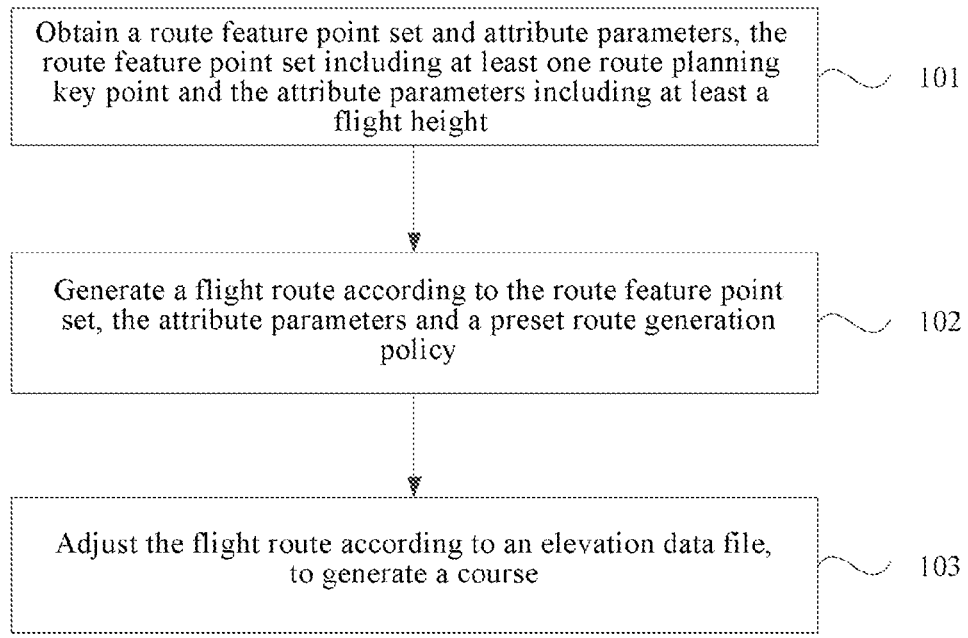
FIG. 1 is a flowchart of a method for generating a safe flight path for an unmanned aerial vehicle according to Embodiment 1 of the present invention.

FIG. 1 is a flowchart of a method for generating a safe flight path for an unmanned aerial vehicle according to Embodiment 1 of the present invention. This embodiment may be applied to a case of controlling an unmanned aerial vehicle. The method may be performed by an apparatus for generating a safe flight path for an unmanned aerial vehicle. The apparatus may be integrated in the unmanned aerial vehicle. The apparatus may be implemented by using hardware and/or software. Referring to FIG. 1, the method includes:

Step 101: Obtain a path feature point set and attribute parameters, the path feature point set including at least one path planning key point and the attribute parameters including at least a flight height.

A control terminal may be connected to the unmanned aerial vehicle and may send data to the unmanned aerial vehicle to control the unmanned aerial vehicle. The control terminal may be specifically a remote control of the unmanned aerial vehicle or a smartphone with control software installed. The path feature point set may be a set of feature points used for planning a flight path, which may be sent to the unmanned aerial vehicle by the control terminal. The attribute parameters may be attribute parameters of controlling flight of the unmanned aerial vehicle, which may include flight parameters such as a flight height, a flight speed, a maximum flight altitude and a minimum flight altitude. The attribute parameters may be inputted to the control terminal by a user and sent to the unmanned aerial vehicle by the control terminal. Path planning key points may be feature points in the flight path of the unmanned aerial vehicle, which may be, for example, location points with flight path key features such as a turning point and a rising point. The flight height may be a height at which the unmanned aerial vehicle flies in the flight path, which may be a fixed value or a set of values.

In this embodiment of the present invention, the unmanned aerial vehicle may receive the path feature point set and the attribute parameters sent by the control terminal and used for generating a flight path of the unmanned aerial vehicle. The path feature point set may be a set including feature location points for generating the flight path of the unmanned aerial vehicle. The attribute parameters may be flight attributes for generating the flight path of the unmanned aerial vehicle, such as the flight height and the flight speed. The path feature point set and the attribute parameters obtained by the unmanned aerial vehicle may be alternatively directly inputted into the unmanned aerial vehicle by the user. It may be understood that the path feature point set and the attribute parameters received by the unmanned aerial vehicle may be in the form of fusion of the path feature point set and the attribute parameters. For example, the path planning key points in the path feature point set may include respective flight heights. Alternatively, the path feature point set and the attribute parameters exist independently. The path planning key points in the path feature point set do not include the flight height and the attribute parameters exist in the form of separate packets.

Step 102: Generate a flight path according to the path feature point set, the attribute parameters and a preset path generation policy.

The preset path generation policy may be a policy used for generating the flight path of the unmanned aerial vehicle, which may be preset inside the unmanned aerial vehicle. The flight path of the unmanned aerial vehicle may be generated according to the obtained path feature point set and attribute parameters. The flight path may be a flight path generated by the unmanned aerial vehicle according to the received path feature point set and attribute parameters. A first flight path may include flight points and flight heights corresponding to the flight points.

Specifically, a path generation policy may be preset in the unmanned aerial vehicle. When the path feature point set and the attribute parameters are obtained, the path feature point set and the attribute parameters may be used as an input of the path generation policy. An output result of the path generation policy may be used as a flight path. The flight path may specifically include flight points and flight parameters corresponding to the flight points. It may be understood that there are many path generation policies in the related art, which are not described in detail in the present application. For example, path planning key points in a first path feature point set may be fitted to generate an initial planned path and then attribute parameters are used as corresponding flight parameters to generate a flight path.

Step 103: Adjust the flight path according to an elevation data file, to generate a flight path.

The elevation data file may store all terrains in a region where the current unmanned aerial vehicle is located and distances from vertexes of buildings to the horizontal plane along a plumb line. The elevation data file may be pre-stored in the unmanned aerial vehicle. When being shipped from the factory, the unmanned aerial vehicle may pre-store all elevation data in the unmanned aerial vehicle. Alternatively, the unmanned aerial vehicle may be connected to the control terminal before planning the first flight path and obtain stored elevation data of a current geographic location of the unmanned aerial vehicle. Alternatively, the unmanned aerial vehicle downloads elevation data during flight according to a location of the unmanned aerial vehicle.

In this embodiment of the present invention, the generated flight path may be adjusted according to the elevation data. For example, the flight height in the flight path may be automatically changed with the elevation data in the elevation data file. Alternatively, target elevation data of the highest one of flight paths may be determined according to the elevation data file, the flight path may be adjusted based on the target elevation data and the adjusted flight path may be used as the flight path of the unmanned aerial vehicle.

According to the technical solution of this embodiment of the present invention, a path feature point set and attribute parameters are obtained; a flight path is generated according to the path feature point set, the attribute parameters and a preset path generation policy; and the flight path is adjusted according to an elevation data file, to generate a flight path. The flight path generation process of the unmanned aerial vehicle only requires obtaining of the path feature point set and the attribute parameters, without the need to obtain complete flight path data, which reduces the data volume of communication between the unmanned aerial vehicle and the control terminal. The flight path generation process refers to the elevation data, which avoids occurrence of collision accidents of the unmanned aerial vehicle, thereby effectively improving the flight safety of the unmanned aerial vehicle.

Embodiment 2

Figure 2A:
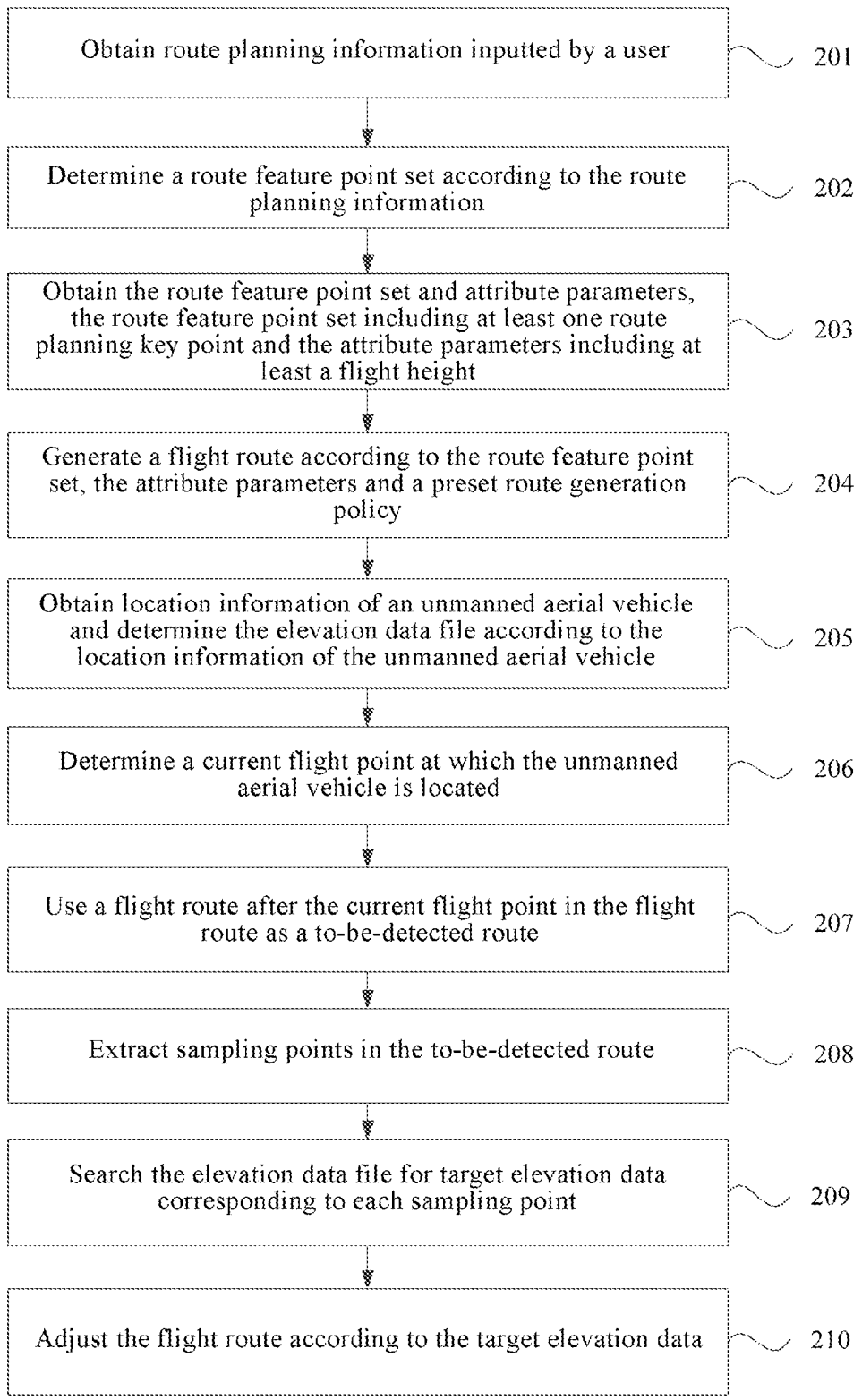
FIG. 2a is a flowchart of a method for generating a safe flight path for an unmanned aerial vehicle according to Embodiment 2 of the present invention.

FIG. 2a is a flowchart of a method for generating a safe flight path for an unmanned aerial vehicle according to Embodiment 2 of the present invention. This embodiment is embodied based on the foregoing embodiment. This method may be applied to an unmanned aerial vehicle. In this embodiment of the present invention, referring to FIG. 2a, the method provided in this embodiment of the present invention includes:

Step 201: Obtain path planning information inputted by a user.

Figure 2B:
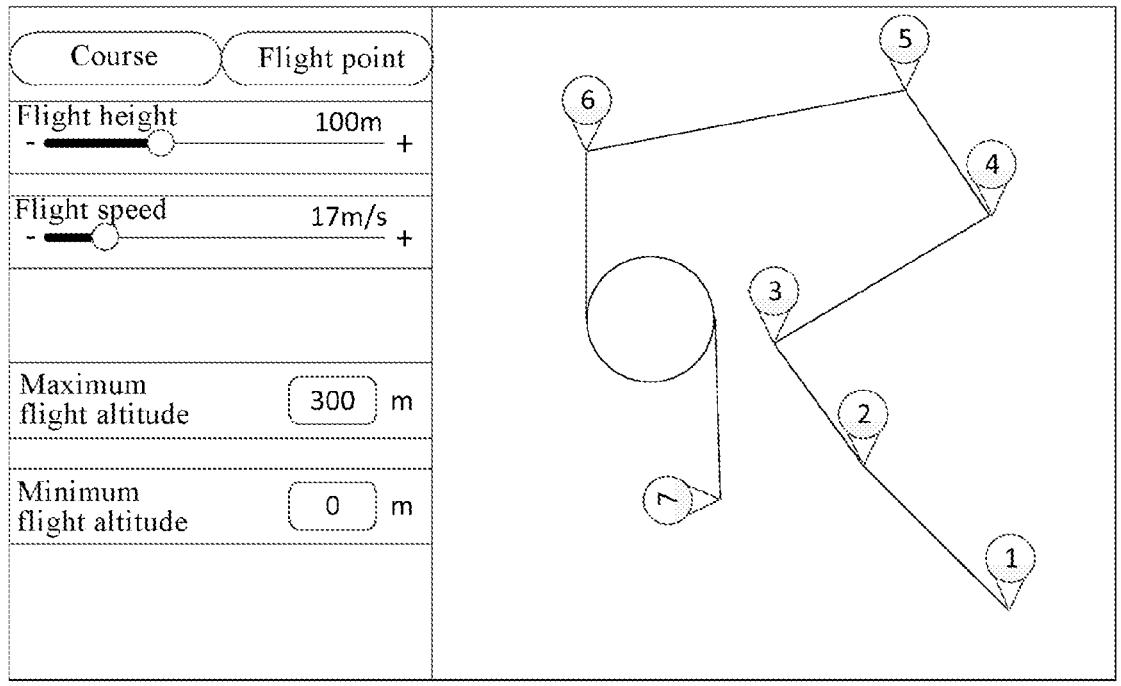
FIG. 2b is a schematic diagram of a user data input interface according to Embodiment 2 of the present invention.

The path planning information may be information inputted by the user and used for generating a flight path of the unmanned aerial vehicle, which may include, for example, sliding trajectory information in an input interface and click location information in the input interface of the user. FIG. 2b is a schematic diagram of a user data input interface according to Embodiment 2 of the present invention. Referring to FIG. 2b, the user may select input parameters such as a flight height, a flight speed, a maximum flight altitude and a minimum flight altitude in the input interface. The information inputted by the user in the input interface may be obtained as attribute parameters. The user may further click a location in the input interface to generate a flight path or slide to generate a flight path. Click location information or sliding trajectory information may be obtained as the path planning information.

Specifically, the flight height and the flight speed inputted by the user in the interface may be obtained. The obtained flight height may be used as a flight parameter. The click location information and the sliding trajectory information used by the user to generate the flight path in the interface may be obtained. The obtained click location information and sliding trajectory information may be used as the path planning information. It may be understood that the user may input the path planning information into the control terminal that controls the unmanned aerial vehicle. The control terminal may send the path planning information to the unmanned aerial vehicle. The user may alternatively directly input the path planning information into the unmanned aerial vehicle. The unmanned aerial vehicle may be provided with an interface for information input.

Step 202: Determine a path feature point set according to the path planning information.

The path feature point set may be a set of feature points used for generating a flight path of the unmanned aerial vehicle, which may be generated according to the path planning information inputted by the user. The path planning information may include touch planning information and sliding trajectory planning information. The touch planning information may be touch location information inputted by the user in the input interface and may be information used for generating a flight path of the unmanned aerial vehicle. The touch planning information may include longitude and latitude information corresponding to a user touch location map. The sliding trajectory planning information may be trajectory information corresponding to a sliding operation of the user in the input interface, which may include longitude and latitude information corresponding to a sliding trajectory location map.

In this embodiment of the present invention, the path feature point set may be determined according to the obtained touch planning information and/or sliding trajectory planning information. The manner of determining the path feature point set may be specifically to use location points included in the touch planning information as elements in the path feature point set. Alternatively, feature points may be selected in the sliding trajectory planning information according to a sliding trajectory and the feature points may be used as the elements in the path feature point set.

Step 203: Obtain the path feature point set and attribute parameters, the path feature point set including at least one path planning key point and the attribute parameters including at least a flight height.

In this embodiment of the present invention, the unmanned aerial vehicle may first receive the path feature point set and the attribute parameters sent by the control terminal. The path feature point set may be a set of path planning key points, which is used for generating a flight path of the unmanned aerial vehicle. The attribute parameters may include a flight height. The attribute parameters may be parameters for controlling the flight of the unmanned aerial vehicle. First attribute parameters may further include a flight speed, a maximum flight altitude and a minimum flight altitude.

Step 204: Generate a flight path according to the path feature point set, the attribute parameters and a preset path generation policy.

Specifically, the preset path generation policy may be encapsulated as a model. The first path feature point set and the first attribute parameters may be used as an input of the model. An output result may be used as a flight path. There are many path generation policies in the related art, which are not enumerated herein. For example, the flight path may be generated by fitting according to the path planning key points in the path feature point set.

Step 205: Obtain location information of an unmanned aerial vehicle and determine the elevation data file according to the location information of the unmanned aerial vehicle.

The location information may include information about the geographic location of the unmanned aerial vehicle, which may be a city, a region and/or longitude and latitude. The elevation data file may be a data table including terrain elevation data of the location of the unmanned aerial vehicle.

Specifically, information about the region where the unmanned aerial vehicle is currently located may be obtained. For example, location information of the city where the unmanned aerial vehicle is located may be obtained. A terrain elevation data file of the corresponding region may be searched according to the obtained location information. The found data may be used as the elevation data file corresponding to the location information of the unmanned aerial vehicle.

Step 206: Determine a current flight point at which the unmanned aerial vehicle is located.

The current flight point may be a current location of the unmanned aerial vehicle when the unmanned aerial vehicle flies along the flight path, which may be determined according to the longitude and latitude of the location of the unmanned aerial vehicle.

In this embodiment of the present invention, the location information of the current location of the unmanned aerial vehicle in the flight path may be obtained, which may specifically include the longitude and latitude data of the unmanned aerial vehicle. The determined location information may be used for determining a flight point of the unmanned aerial vehicle. It may be understood that the current flight point may be further marked in the flight path. The current flight point may be displayed on a display interface of the control terminal in a manner of changing a color or form.

Step 207: Use a flight path after the current flight point in the flight path as a to-be-detected path.

The to-be-detected path may be a flight path of the unmanned aerial vehicle in the flight path and be specifically a flight path after the current flight point.

Specifically, a target location in the flight path may be determined according to the current flight point. A flight path after the target location may be used as a to-be-detected path in which the unmanned aerial vehicle has not flown. The unmanned aerial vehicle may detect the elevation data file at a location in the to-be-detected path, to obtain corresponding elevation data.

Step 208: Extract sampling points in the to-be-detected path.

The sampling points may be a set of location points obtained according to a fixed distance in the to-be-detected path, which may be selected randomly or may be selected according to a threshold distance. The manner of selecting the sampling points is not limited in this embodiment of the present invention. For example, one sampling point may be obtained every 30 m in the to-be-detected path. In this embodiment of the present invention, the sampling points in the to-be-detected path may be extracted randomly or according to a fixed threshold distance.

Step 209: Search the elevation data file for target elevation data corresponding to each sampling point.

The target elevation data may be elevation data corresponding to each sampling point, which may be obtained by querying the elevation data file through location information of the sampling points.

Specifically, the elevation data file may be queried according to the location information of the sampling points and found elevation data may be used as the target elevation data corresponding to each sampling point.

Step 210: Adjust the flight path according to the target elevation data.

Specifically, the obtained target elevation data may be used as a flight height of the unmanned aerial vehicle at each sampling point in the flight path, to adjust the flight path.

Further, based on the foregoing embodiment of the present invention, the adjusting the flight path according to the target elevation data includes:

skipping adjusting the flight path when heights of the sampling points are all greater than or equal to the target elevation data plus a relative height; and adjusting the flight path according to a preset adjustment policy when there is a sampling point whose height is less than the target elevation data plus the relative height.

A height of a sampling point may be a flight height of the unmanned aerial vehicle when passing the sampling point. The relative height may be a difference between a flight height of the unmanned aerial vehicle and a level of the target elevation data, which may be set manually. For example, if the relative height is set to 5 m, the target elevation data plus 5 m is equivalently used as a minimum flight height of the unmanned aerial vehicle at a corresponding first sampling point, which can further prevent the unmanned aerial vehicle from having a collision accident.

Specifically, a height of a sampling point may be compared with a sum of the target elevation data and the relative height. If the height is greater than or equal to the sum of the target elevation data and the relative height, it may indicate that the unmanned aerial vehicle cannot collide with an object when flying at the sampling point. If the height is less than the sum of the target elevation data and the relative height, it may indicate that the unmanned aerial vehicle may collide with a high-rise object when flying at the sampling point. The flight path may be adjusted according to an adjustment policy. The preset adjustment policy may be a policy for adjusting the flight height of the unmanned aerial vehicle in the flight path. For example, the flight height may be adjusted to a threshold height or an average of the target elevation data plus the flight height may be used as the flight height in the flight path.

Further, based on the foregoing embodiment of the present invention, the adjusting the flight path according to a preset adjustment policy includes:

determining the sampling point whose height is less than the target elevation data plus the relative height as a flight obstacle point; and adjusting a height of the flight path at the flight obstacle point.

The flight obstacle point may be a location point in the flight path at which a terrain collision accident of the unmanned aerial vehicle occurs. The flight height at the flight obstacle point is less than the sum of the target elevation data and the relative height.

In this embodiment of the present invention, the sampling point at which a flight height is less than the sum of the corresponding target elevation data and the relative height in the to-be-detected path is used as a flight obstacle point. A flight height of the unmanned aerial vehicle at the flight obstacle point may be adjusted. The adjustment manner may include using the original flight height plus the target elevation data as a new flight height.

Further, based on the foregoing embodiment of the present invention, the adjusting a height of the flight path at the flight obstacle point includes:

adjusting a flight height of the flight path at the flight obstacle point to exceed the target elevation data plus the relative height.

According to the technical solution of this embodiment of the present invention, path planning information inputted by a user is obtained. A path feature point set is determined according to the path planning information. A flight path is determined according to the path feature point set, attribute parameters and a preset path generation policy. Location information of an unmanned aerial vehicle is obtained. An elevation data file is determined according to the location information of the unmanned aerial vehicle. According to a current flight point of the unmanned aerial vehicle, a flight path after the current flight point is obtained as a to-be-detected path. Sampling points are extracted in the to-be-detected path. Target elevation data corresponding to each sampling point is extracted from the elevation data file. The flight path is adjusted according to the target elevation data. The flight path of the unmanned aerial vehicle is dynamically adjusted. The flight height is determined according to the elevation data, to avoid possible tall buildings or mountains, thereby improving the safety of flight of the unmanned aerial vehicle.

Embodiment 3

Figure 3A:
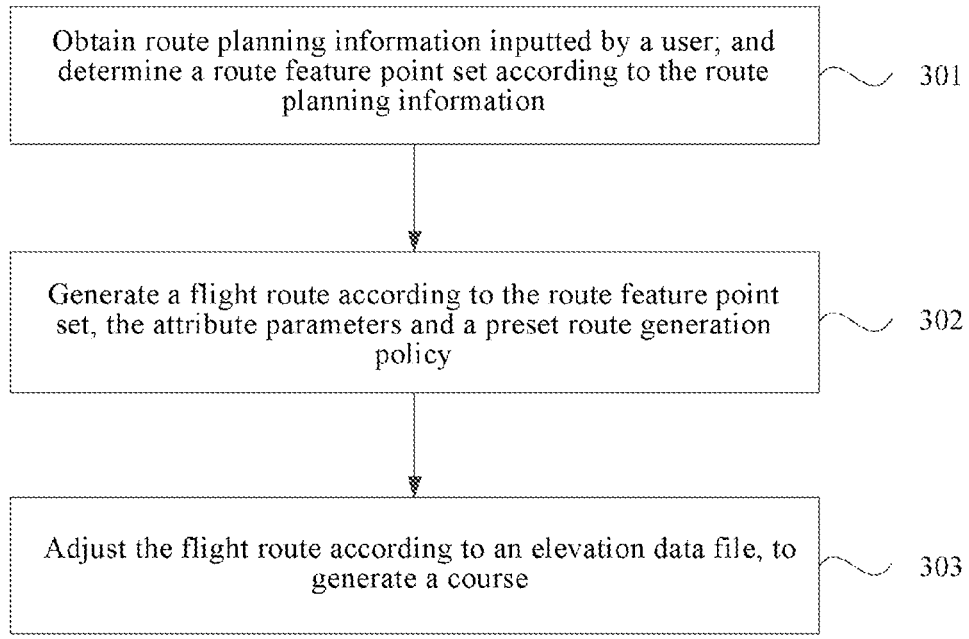
FIG. 3a is a flowchart of a method for generating a safe flight path for an unmanned aerial vehicle according to Embodiment 3 of the present invention.

FIG. 3a is a flowchart of a method for generating a safe flight path for an unmanned aerial vehicle according to Embodiment 3 of the present invention. This embodiment may be applied to a case of controlling an unmanned aerial vehicle to fly. The method may be performed by an apparatus for controlling an unmanned aerial vehicle. The apparatus may be implemented by using hardware and/or software. The apparatus may be integrated in a control terminal. Referring to FIG. 3a, the method includes:

Step 301: Obtain path planning information inputted by a user; and determine a path feature point set according to the path planning information.

The path feature point set may be a set of feature points used for generating a flight path of the unmanned aerial vehicle, which may be generated according to the inputted path planning information. Touch planning information may be touch location information inputted by the user in an input interface of the control terminal and may be information used for generating a flight path of the unmanned aerial vehicle. The touch planning information may include longitude and latitude information corresponding to a user touch location map. The sliding trajectory planning information may be trajectory information corresponding to a sliding operation of the user in the input interface, which may include longitude and latitude information corresponding to a sliding trajectory location map.

In this embodiment of the present invention, the path feature point set may be determined according to the obtained touch planning information and/or sliding trajectory planning information. The manner of determining the path feature point set may be specifically to use location points included in the touch planning information as points in the path feature point set. Alternatively, feature points may be further selected in the sliding trajectory planning information according to a sliding trajectory and the feature points may be used as the points in the path feature point set.

Step 302: Generate a flight path according to the path feature point set, the attribute parameters and a preset path generation policy.

Figure 3B:
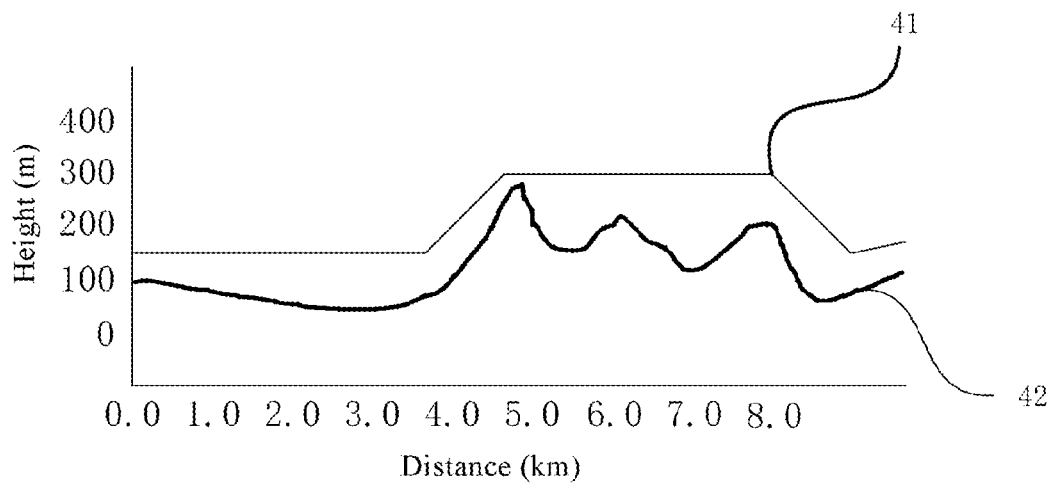
FIG. 3b is a diagram showing a flight path display effect according to Embodiment 3 of the present invention.

Specifically, the path feature point set and the attribute parameters may be sent to the unmanned aerial vehicle. The path feature point set and the attribute parameters may exist separately or as a whole. For example, the attribute parameters may be fused into the path feature point set. Each point in the path feature point set has a corresponding flight height. The unmanned aerial vehicle may generate a flight path for flight control according to the path feature point set and the attribute parameters sent by the control terminal. The flight path may be displayed at the control terminal to display the flight situation of the unmanned aerial vehicle. After the flight path is generated, the control terminal may display the generated flight path. FIG. 3b is a diagram showing a flight path display effect according to Embodiment 3 of the present invention. Referring to FIG. 3b, a flight path 41 and a terrain 42 may be displayed together, so that the user can intuitively understand a relationship between a flight height of the second flight path 41 and an elevation of the terrain 42.

Step 303: Adjust the flight path according to an elevation data file, to generate a flight path.

Specifically, after receiving a terrain following instruction sent by the user, the control terminal may adjust the flight path according to elevation data in the elevation data file, for example, according to all elevation data of the location in the flight path. A maximum elevation in all the elevation data may be obtained and used as a flight height of the unmanned aerial vehicle in a first flight path, to adjust the first flight path according to the elevation data file. It may be understood that, in this embodiment of the present invention, after receiving the terrain following instruction, the control terminal may adjust the flight path at a time with reference to the elevation data file or may adjust the flight path in sections with reference to the elevation data, that is, may adjust the flight path while the unmanned aerial vehicle is flying.

Further, when the flight path is adjusted according to the elevation data file to generate a flight path, a sampling point whose height is less than the target elevation data plus the relative height may be determined as a flight obstacle point; and a height of the flight path at the flight obstacle point is adjusted.

Figure 3C:
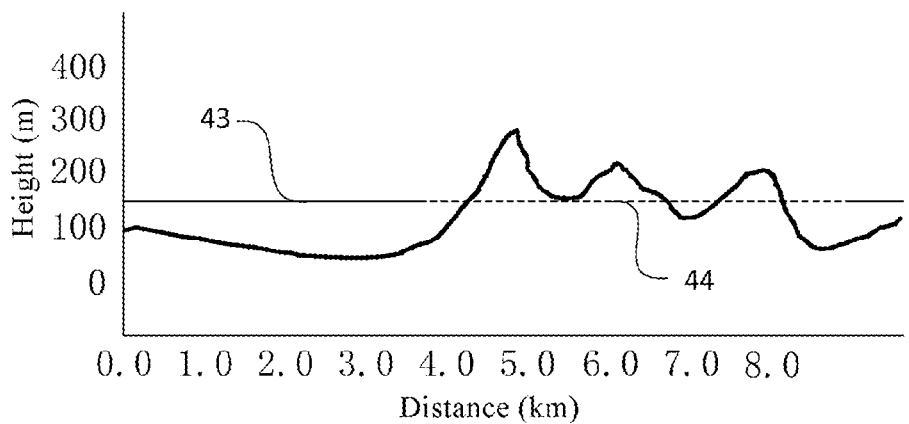
FIG. 3c is a diagram showing a flight path display effect according to Embodiment 3 of the present invention.

Specifically, the sampling point at which a flight height is less than the sum of the corresponding target elevation data and the relative height in the to-be-detected path is used as a flight obstacle point. A flight height at the flight obstacle point in the flight path may be adjusted, to adjust the flight path and generate a flight path. In the control terminal, the user may be reminded that there is a flight obstacle in the flight path of the unmanned aerial vehicle. A region where the flight obstacle point is located and a nearby region may be specially highlighted and displayed. FIG. 3c is a diagram showing a flight path display effect according to Embodiment 3 of the present invention. Referring to FIG. 3c, there are a non-highlighted part 43 and a highlighted part 44 in the second flight path. In the non-highlighted part, because a flight height of the unmanned aerial vehicle is greater than or equal to a sum of target elevation data of the corresponding terrain and the relative height, the unmanned aerial vehicle does not have the problem of colliding with the terrain. Moreover, in the highlighted part 44, because a flight height of the unmanned aerial vehicle is less than a sum of target elevation data of the corresponding terrain and the relative height, the unmanned aerial vehicle collides with the terrain when flying. Therefore, the user is reminded that there is a flight obstacle of the unmanned aerial vehicle in a manner of highlighting, where the highlighting may be special display in displayed content, so that the user can discover highlighted content in time. The manner of highlighting may include: coloring, changing presentation graphics, adding background colors and the like.

According to the technical solution of this embodiment of the present invention, the path planning information inputted by the user is obtained to determine the path feature point set. The flight path is generated according to the path feature point set, the attribute parameters and the preset path generation policy. The flight path is adjusted according to the elevation data file to generate the path. Therefore, a safe flight path of the unmanned aerial vehicle is planned. The elevation data is taken into consideration in the flight path planning process, which avoids obstacles in the flight process of the unmanned aerial vehicle and reduces the probability of occurrence of collision accidents of the unmanned aerial vehicle, thereby improving user experience.

Embodiment 4

Figure 4:
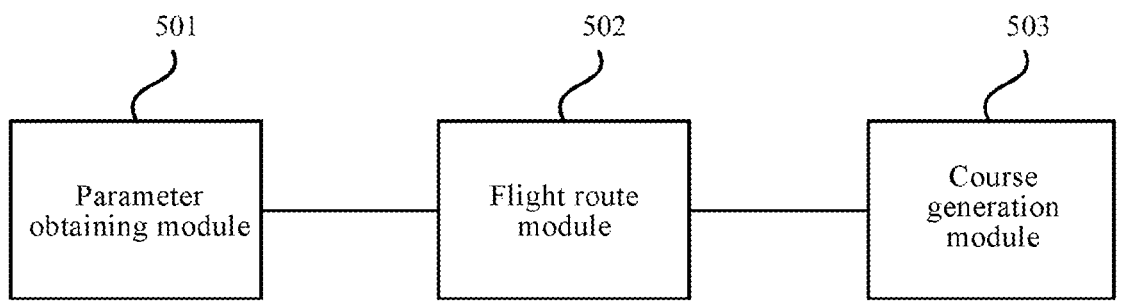
FIG. 4 is a schematic structural diagram of an apparatus for generating a safe flight path for an unmanned aerial vehicle according to Embodiment 4 of the present invention.

FIG. 4 is a schematic structural diagram of an apparatus for generating a safe flight path for an unmanned aerial vehicle according to Embodiment 4 of the present invention. The apparatus for generating a safe flight path for an unmanned aerial vehicle provided in this embodiment of the present invention can perform the method for generating a safe flight path for an unmanned aerial vehicle provided in any embodiment of the present invention and has corresponding functional modules for performing the method and beneficial effects. The apparatus may be implemented by using software and/or hardware and may be integrated in an unmanned aerial vehicle and/or a control terminal. The apparatus specifically includes: a parameter obtaining module 501, a flight path module 502 and a flight path generation module 503.

The parameter obtaining module 501 is configured to obtain a path feature point set and attribute parameters, the path feature point set including at least one path planning key point and the attribute parameters including at least a flight height.

The flight path module 502 is configured to generate a flight path according to the path feature point set, the attribute parameters and a preset path generation policy.

The flight path generation module 503 is configured to adjust the flight path according to an elevation data file, to generate a flight path.

According to the technical solution of this embodiment of the present invention, a parameter obtaining module obtains a path feature point set and attribute parameters; a flight path module generates a flight path according to the path feature point set, the attribute parameters and a preset path generation policy; and a flight path generation module adjusts the flight path according to an elevation data file, to generate a flight path. The flight path generation process of the unmanned aerial vehicle only requires obtaining of the path feature point set and the attribute parameters, without the need to obtain complete flight path data, which reduces the data volume of communication between the unmanned aerial vehicle and the control terminal. The flight path generation process refers to the elevation data, which avoids a case that the unmanned aerial vehicle has a collision accident, thereby effectively improving the flight safety of the unmanned aerial vehicle.

Further, based on the foregoing embodiment of the present invention, the apparatus further includes:
a pre-processing module, configured to obtain path planning information inputted by a user; and determine the path feature point set according to the path planning information.

Further, based on the foregoing embodiment of the present invention, the apparatus further includes:
an elevation data file determining module, configured to obtain location information of an unmanned aerial vehicle and determine the elevation data file according to the location information of the unmanned aerial vehicle.

Further, based on the foregoing embodiment of the present invention, the flight path generation module includes:
a flight point unit, configured to determine a current flight point at which the unmanned aerial vehicle is located;
a to-be-detected path unit, configured to use a flight path after the current flight point in the flight path as a to-be-detected path;
a sampling point unit, configured to extract sampling points in the to-be-detected path; and
a path adjustment unit, configured to search the elevation data file for target elevation data corresponding to each sampling point; and adjust the flight path according to the target elevation data.

Further, based on the foregoing embodiment of the present invention, the path adjustment unit includes:
an adjustment skipping subunit, configured to skip adjusting the flight path when heights of the sampling points are all greater than or equal to the target elevation data plus a relative height; and
an adjustment subunit, configured to adjust the flight path according to a preset adjustment policy when there is a sampling point whose height is less than the target elevation data plus the relative height.

Further, based on the foregoing embodiment of the present invention, the adjustment subunit are further configured to:
determine the sampling point whose height is less than the target elevation data plus the relative height as a flight obstacle point; and
adjust a height of the flight path at the flight obstacle point.

Further, based on the foregoing embodiment of the present invention, the adjusting a height of the flight path at the flight obstacle point by the adjustment subunit is specifically:
adjusting a flight height of the flight path at the flight obstacle point to exceed the target elevation data plus the relative height.

Embodiment 5

Figure 5:
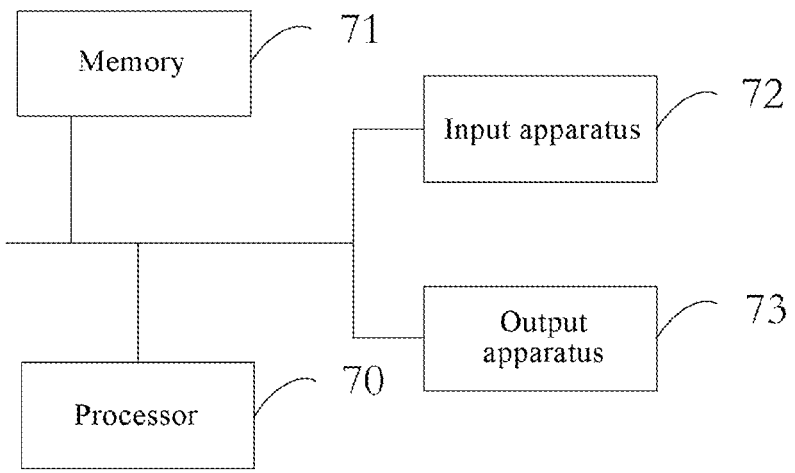
FIG. 5 is a schematic structural diagram of an unmanned aerial vehicle according to Embodiment 5 of the present invention.

FIG. 5 is a schematic structural diagram of an unmanned aerial vehicle according to Embodiment 5 of the present invention. As shown in FIG. 5, the unmanned aerial vehicle includes a processor 70, a memory 71, an input apparatus 72 and an output apparatus 73. There may be one or more processors 70 in the unmanned aerial vehicle. One processor 70 is taken as an example in FIG. 5. The processor 70, the memory 71, the input apparatus 72 and the output apparatus 73 in the unmanned aerial vehicle may be connected by using a bus or in another manner. In FIG. 5, an example in which connection is performed by using a bus is taken.

As a computer-readable storage medium, the memory 71 may be configured to store a software program, a computer-executable program and a module, for example, program modules (for example, a parameter obtaining module 501, a flight path generation module 502 and a flight control module 503 in the apparatus for controlling an unmanned aerial vehicle) corresponding to a method for controlling an unmanned aerial vehicle in an embodiment of the present invention. The processor 70 executes various functional applications and data processing of the unmanned aerial vehicle by running the software program, instructions and the modules stored in the memory 71, to implement the foregoing method for controlling an unmanned aerial vehicle.

The memory 71 may mainly include a program storage area and a data storage area. The program storage area may store an operating system and an application program required by at least one function. The data storage area may store data created according to use of the terminal. In addition, the memory 71 may include a high speed random access memory and may further include a non-volatile memory such as at least one magnetic disk storage device, a flash memory, or another volatile solid storage device. In some examples, the memory 71 may further include memories remotely disposed relative to the processor 70. The remote memories may be connected to the unmanned aerial vehicle through a network. The foregoing examples of the network include, but are not limited to, the Internet, an intranet, a local area network, a mobile communication network and a combination thereof.

The input apparatus 72 may be configured to receive control information sent by the user and generate a signal input related to the user setting and function control of the unmanned aerial vehicle. The output apparatus 73 may be configured to output a signal generated by the unmanned aerial vehicle and may include a flight status feedback interface and/or a display screen.

Embodiment 6

Figure 6:
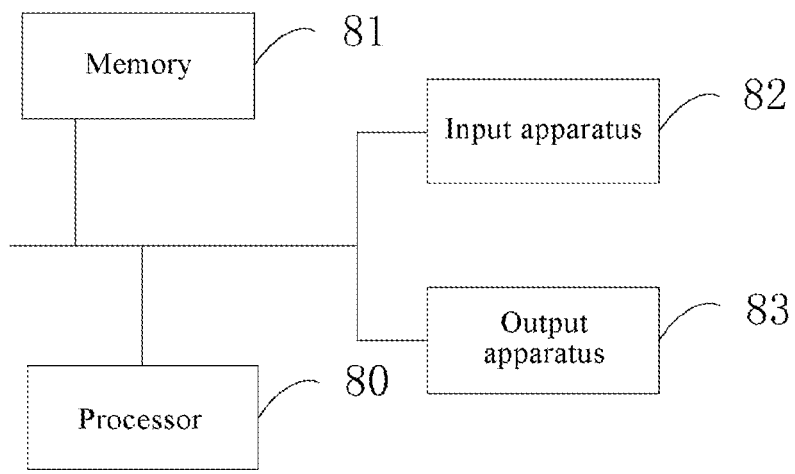
FIG. 6 is a schematic structural diagram of a control terminal according to Embodiment 6 of the present invention.

FIG. 6 is a schematic structural diagram of a control terminal according to Embodiment 6 of the present invention. As shown in FIG. 6, the control terminal includes a processor 80, a memory 81, an input apparatus 82 and an output apparatus 83. There may be one or more processors 80 in the control terminal. One processor 80 is taken as an example in FIG. 6. The processor 80, the memory 81, the input apparatus 82 and the output apparatus 83 in the control terminal may be connected by using a bus or in another manner. In FIG. 6, an example in which connection is performed by using a bus is taken.

As a computer-readable storage medium, the memory 81 may be configured to store a software program, a computer-executable program and a module, for example, program modules (for example, a parameter obtaining module 501, a flight path generation module 502 and a flight control module 503 in an apparatus for controlling a control terminal) corresponding to a method for controlling a control terminal in an embodiment of the present invention. The processor 80 executes various functional applications and data processing of the control terminal by running the software program, instructions and the modules stored in the memory 81, to implement the foregoing method for controlling a control terminal.

The memory 81 may mainly include a program storage area and a data storage area. The program storage area may store an operating system and an application program required by at least one function. The data storage area may store data created according to use of the terminal. In addition, the memory 81 may include a high speed random access memory and may further include a non-volatile memory such as at least one magnetic disk storage device, a flash memory, or another volatile solid storage device. In some examples, the memory 81 may further include memories remotely disposed relative to the processor 80. The remote memories may be connected to the control terminal through a network. The foregoing examples of the network include, but are not limited to, the Internet, an intranet, a local area network, a mobile communication network and a combination thereof.

The input apparatus 82 may be configured to receive inputted digit or character information and generate a key signal input related to the user setting and function control of the control terminal. The output apparatus 83 may include a display device such as a display screen.

It should be noted that, the various units and modules included in the foregoing embodiments of the apparatus for generating a safe flight path for an unmanned aerial vehicle are merely divided according to functional logic, but are not limited to the foregoing division, as long as corresponding functions can be implemented. In addition, specific names of the functional units are also only for the convenience of differentiating each other and are not intended to limit the protection scope of the present invention.

It should be noted that the above are only exemplary embodiments of the present invention and applied technical principles. A person skilled in the art understands that the present invention is not limited to the specific embodiments described herein. Various obvious changes, readjustments and substitutions can be made by a person skilled in the art without departing from the protection scope of the present invention. Therefore, although the present invention is described in detail through the foregoing embodiments, the present invention is not limited to the foregoing embodiments and may further include more other equivalent embodiments without departing from the concept of the present invention. The scope of the present invention is determined by the scope of the appended claims.

What is claimed is:

1. A method for generating a safe flight path for an unmanned aerial vehicle, comprising:
    obtaining path planning information inputted by a user via an input interface, wherein the input interface comprises a left panel and a right panel, wherein the left panel has a flight height with a sliding scale from 0 to about 100 meters, a flight speed with a sliding scale from 0 to about 17 m/s, a maximum flight altitude around 100 meters, a minimum flight altitude about 0 meter, and the right panel has a sliding trajectory information;
    determining the path feature point set according to the path planning information;
    obtaining attribute parameters, the path feature point set comprising at least one path planning key point and the attribute parameters comprising at least the flight height;
    generating a flight path according to the path feature point set, the attribute parameters and a preset path generation policy;
    adjusting the flight path according to an elevation data file, to generate the safe flight path;
    obtaining location information of the unmanned aerial vehicle and determining the elevation data file according to the location information of the unmanned aerial vehicle;
    determining a current flight point at which the unmanned aerial vehicle is located;
    using a flight path after the current flight point in the flight path as a to-be-detected path;
    extracting sampling points in the to-be-detected path;
    searching the elevation data file for target elevation data corresponding to each sampling point; and
    adjusting the flight path according to the target elevation data;
    wherein the adjusting the flight path according to the target elevation data comprises:
        skipping adjusting the flight path when heights of the sampling points are all greater than or equal to the target elevation data plus a relative height; and
        adjusting the flight path according to a preset adjustment policy when there is a sampling point whose height is less than the target elevation data plus the relative height;
    wherein the adjusting the flight path according to the preset adjustment policy comprises:
        determining the sampling point whose height is less than the target elevation data plus the relative height as a flight obstacle point; and
        adjusting a height of the flight path at the flight obstacle point.

2. The method according to claim 1, wherein the adjusting the height of the flight path at the flight obstacle point comprises:
adjusting a flight height of the flight path at the flight obstacle point to exceed the target elevation data plus the relative height.

3. An apparatus for generating a safe flight path for an unmanned aerial vehicle, comprising:
one or more processors; and
a memory, configured to store one or more programs,
the one or more programs, when executed by the one or more processors, causing the one or more processors to:
obtain path planning information inputted by a user via an input interface, wherein the input interface comprises a left panel and a right panel, wherein the left panel has flight height with a sliding scale from 0 to about 100 meters, a flight speed with a sliding scale from 0 to about 17 m/s, a maximum flight altitude around 100 meters, a minimum flight altitude about 0 meter, and the right panel has a sliding trajectory information;
determine the path feature point set according to the path planning information;
obtain attribute parameters, the path feature point set comprising at least one path planning key point and the attribute parameters comprising at least the flight height;
generate a flight path according to the path feature point set, the attribute parameters and a preset path generation policy;
adjust the flight path according to an elevation data file, to generate the safe flight path;
obtain location information of the unmanned aerial vehicle and determine the elevation data file according to the location information of the unmanned aerial vehicle;
determine a current flight point at which the unmanned aerial vehicle is located;
use the flight path after the current flight point in the flight path as a to-be-detected path;
extract sampling points in the to-be-detected path;
search the elevation data file for target elevation data corresponding to each sampling point; and
adjust the flight path according to the target elevation data;
skip adjusting the flight path when heights of the sampling points are all greater than or equal to the target elevation data plus a relative height;
adjust the flight path according to a preset adjustment policy when there is a sampling point whose height is less than the target elevation data plus the relative height;
determine the sampling point whose height is less than the target elevation data plus the relative height as a flight obstacle point; and
adjust a height of the flight path at the flight obstacle point.

4. The apparatus according to claim 3, wherein the one or more processors are further configured to:
adjust a flight height of the flight path at the flight obstacle point to exceed the target elevation data plus the relative height.

5. An unmanned aerial vehicle, comprising:
one or more processors; and
a memory, configured to store one or more programs,
the one or more programs, when executed by the one or more processors, causing the one or more processors to:
obtain path planning information inputted by a user via an input interface, wherein the input interface comprises a left panel and a right panel, wherein the left panel has flight height with a sliding scale from 0 to about 100 meters, a flight speed with a sliding scale from 0 to about 17 m/s, a maximum flight altitude around 100 meters, a minimum flight altitude about 0 meter, and the right panel has a sliding trajectory information;
determine the path feature point set according to the path planning information;
obtain attribute parameters, the path feature point set comprising at least one path planning key point and the attribute parameters comprising at least the flight height;
generate a flight path according to the path feature point set, the attribute parameters and a preset path generation policy;
adjust the flight path according to an elevation data file, to generate the safe flight path;
obtain location information of the unmanned aerial vehicle and determine the elevation data file according to the location information of the unmanned aerial vehicle,
determine a current flight point at which the unmanned aerial vehicle is located;
use a flight path after the current flight point in the flight path as a to-be-detected path;
extract sampling points in the to-be-detected path;
search the elevation data file for target elevation data corresponding to each sampling point; and
adjust the flight path according to the target elevation data;
skip adjusting the flight path when heights of the sampling points are all greater than or equal to the target elevation data plus a relative height;
adjust the flight path according to a preset adjustment policy when there is a sampling point whose height is less than the target elevation data plus the relative height;
determine the sampling point whose height is less than the target elevation data plus the relative height as a flight obstacle point; and
adjust a height of the flight path at the flight obstacle point.

6. The unmanned aerial vehicle according to claim 5, wherein the one or more processors are further configured to:
adjust a flight height of the flight path at the flight obstacle point to exceed the target elevation data plus the relative height.

* * * * *